United States Patent [19]

McNeel

[11] 4,152,692
[45] May 1, 1979

[54] LOW DISTORTION, HIGH SENSITIVITY SEISMOMETER

[75] Inventor: William O. McNeel, Houston, Tex.

[73] Assignee: GEO Space Corporation, Houston, Tex.

[21] Appl. No.: 826,168

[22] Filed: Aug. 19, 1977

[51] Int. Cl.² ............................................. G01V 1/16
[52] U.S. Cl. .............................. 340/17 R; 340/17 SP
[58] Field of Search .......................... 340/17 R, 17 SP

[56] References Cited

U.S. PATENT DOCUMENTS

| 3,577,184 | 5/1971 | McNeel ............................ 340/17 SP |
| 3,602,490 | 8/1971 | Mueller .......................... 340/17 SP X |
| 3,738,445 | 6/1973 | Wilson et al. ................. 340/17 R X |

Primary Examiner—Theodore M. Blum
Attorney, Agent, or Firm—Daniel J. Meaney, Jr.

[57] ABSTRACT

A compact, high sensitivity low distortion seismometer having an elongated tubular outer pole formed of a magnetic material, a magnetic assembly located in the interior of the outer pole and having a permanent magnet and a pair of conductive pole pieces electrically and magnetically coupled to the magnet, a coil and mass assembly positioned for vertical and rotational movement relative to the magnetic assembly and which includes a coil form, a pair of conductive preformed springs one of which is fixedly attached to each end of the coil form, a pair of coils having the center thereof axially aligned with the axis of the coil form with one of the coils positioned at each end of the coil form, a pair of commutating rings, one of which is attached to each end of the coil form and in electrical and physical contact with an adjacent spring, a pair of insulators, one of which is attached to each end of the coil form to support and electrically insulate the conductive spring and commutating ring adjacent thereto from the coil form, a pair of O-rings, one of which is positioned at each end of the coil form and adapted to clamp the conductive spring, commutating ring and insulator adjacent thereto into an integral sub-assembly with the coil form, and a top assembly and a bottom assembly each of which include slideable wiping contacts which are slideably electrically connected to the coil and mass assembly and to the magnetic assembly for forming an electrically conductive path through the rotating coil form is shown.

19 Claims, 21 Drawing Figures

LOW DISTORTION, HIGH SENSITIVITY SEISMOMETER

BACKGROUND OF THE INVENTION

1. Field of the Invention

This invention relates to a novel and improved compact high sensitivity low distortion rotating coil seismometer used in the seismic industry to detect reflected seismic rays produced by seismic energy sources. In particular, this invention relates to a high sensitivity, low distortion seismometer having a fixed magnetic assembly and a rotatable coil and mass assembly which is adapted to move vertically in response to detected seismic waves. In addition, the coil form is capable of rotating relative to the fixed magnetic assembly and housing in response to rotational forces and is capable of maintaining an electrical conductive path between the coil and mass assembly during and after rotation enabling the geophone to operate normally and respond to detected seismic waves.

2. Disclosure of the Prior Art

It is known in the prior art to use a variety of seismometers to detect reflected seismic waves produced by seismic energy sources. A seismometer generally includes a housing which functions as an external pole, a fixed magnetic assembly which includes a permanent magnet and pole pieces and electro-magnetic moving coil form having electrical coils wound thereon. Movement of the coil form having the coils wound thereon relative to a fixed magnet causes the coils to traverse lines of magnetic flux to generate the electrical signal which is representative of the movement of the coil form along its vertical axis.

Typically, the coil and mass assembly are movably supported relative to the magnet assembly by preformed torsion springs mounted to each end of the coil form with the centers of the spring held in position. In such seismometers, the coil and mass assembly is limited as to the degree of rotation thereof relative to the magnetic assembly. Typically, the rotation is limited by the use of pins or other limiting means. In such coil and mass assemblies, the torsion springs which supports the coil and mass assembly are clamped at the center thereof and with the edges rigidly fixed to the coil form such that a high degree of rotation would extend the torsion spring beyond its elastic limit rendering the geophone inoperative.

It is also known in the art to utilize a geophone having a rotational coil and mass assembly wherein the coil form can be rotated in response to external rotational forces. One such seismometer is described in U.S. Pat. No. 3,577,184, which has a common assignee with the present application.

In U.S. Pat. No. 3,577,184, the rotatable coil and mass assembly are formed of a plurality of individually stacked components to establish electrically conductive and rotatable contacts between a preformed spring and spring contact members. In such known rotatable coil and mass assemblies, the coil form is machined with two co-axially aligned shoulders at each end thereof, wherein the shoulder nearest the end of the coil form has a slightly reduced diameter. In order to form a rotatable coil and mass assembly disclosed in the prior art device, a conductive contact element was glued to the shoulder having the reduced diameter. A preformed spring without electrical wiping means was then placed in intimate electrical contact with the glued contact spring. A preformed, rigid insulator having a "U"-shaped connector end or retainer which defined a vertical wall and a tapered shoulder wall was utilized as the retainer or fastener to maintain the sub-assembly of the coil form, glued contact ring and preformed spring intact. Additional top spring contacts, insulators and other separately assembled components were required to complete the assembly.

In the known prior art of rotational coil geophones, the preformed rigid insulator is responsive to changes of temperation by expanding and contracting. One problem is that expansion of the insulator retainer, which functioned as a mechanical keeper, resulted in the retainer separating from the coil form permitting the spring to separate from the electrical contact rendering the geophone inoperative. Another problem is that the electrical connection between the center of the preformed spring and top spring contact is made through two flat surfaces wherein the wiping action occurs between two planar surfaces. Over an extended period of time, the surfaces become contaminated resulting in an increase in resistance between the two contacts resulting in deterioration in the electrical signals generated thereby.

The seismic industry has undertaken steps to simplify the manufacturing process and to reduce the number of components and labor required to assemble the various geophones. Generally, the greater the number of parts and components in the seismometer, the greater the probability that: (a) some part will become damaged; (b) that the mechanical and electrical characteristics thereof will change during field use; that deterioration between components will produce distortion in the seismometer; and (c) that the various components will fatigue and wear due to the frictional interaction therebetween.

Improved seismic exploration methods require using a larger number of seismometers arranged in various arrays to generate electrical signals representative of the reflected detected seismic rays. The electrical signals generated by the seismometer are used as inputs to digital seismic acquisition systems. In digital seismic data acquisition systems, it is highly desirable to reduce the distortion or attentuation of electrical signals which are generated by the seismometer. In order to accomplish the above, the seismic industry requires an improved, compact high sensitivity low distortion seismometer having fewer moving parts, lower manufacturing costs and improved electrical operating characteristics which can be used in larger arrays for acquiring high quality seismic data.

SUMMARY OF THE INVENTION

The compact, high sensitivity, low distortion seismometer of the present invention overcomes several disadvantages of the prior art. One advantage of the present invention is that the coil and mass assembly is responsive to external rotational forces by rotating freely within the seismometer and providing continuous wiping, low-resistance contact between the preformed springs and mating conductors.

The present invention utilizes a unique and improved coil and mass assembly which is independently assembled with preformed, segmentated springs having wiping contacts, commutator rings, insulators and O-rings into an integral assembly which can be easily combined with other assemblies to fabricate a seismometer. In addition, a magnet assembly comprising a permanent magnet and its associated pole pieces are easily inserted into the interior of the coil and mass assembly. A bottom support assembly formed of a base support and bi-level conductive spring supports the magnetic assembly, aligns the coil and mass assembly and provides an electrically conductive path between the electrical coils wound around the coil form and the permanent magnets which function as a return conductive path for the seismometer. A top assembly, having an upper and lower spring contact on a top support, is mounted onto the top of the coil and mass assembly.

The manufacture and assembly of the coil and mass assembly is greatly simplified and symmetrical assembly is obtained by use of common components at each end of the coil form. Use of common components, symmetrical assembly techniques and ease of fabrication of independent assemblies results in reduced manufacturing cost in assembling geophones. Operationally, electrical contact surfaces exhibit the same resistance characteristics under operating conditions, greater linearity of operation and lower distortion over a wider frequency range of operation. In addition, by use of symmetrical construction techniques and reduction of the number of surface contacts between various components within the seismometer, a reduction is obtained in harmonic distortion of the signal.

Another advantage of the present invention is that the seismometer is formed of four basic assemblies which can be pre-assembled in high volume, and then assembled into the housing or outer pole to form the seismometer. Thus, the major assemblies can be used in assembling the seismometer without regard for matching tolerances and specifically avoiding matching of contact members, insulators and preformed springs.

BRIEF DESCRIPTION OF THE DRAWING

The foregoing and other advantages and features of the invention will be apparent from the following description of the preferred embodiment of the invention when considered together with the illustrations in the accompanying drawing and includes the following figures.

Similar numbers refer to similar elements throughout the drawing.

DESCRIPTION OF THE PREFERRED EMBODIMENT

Figure 1:
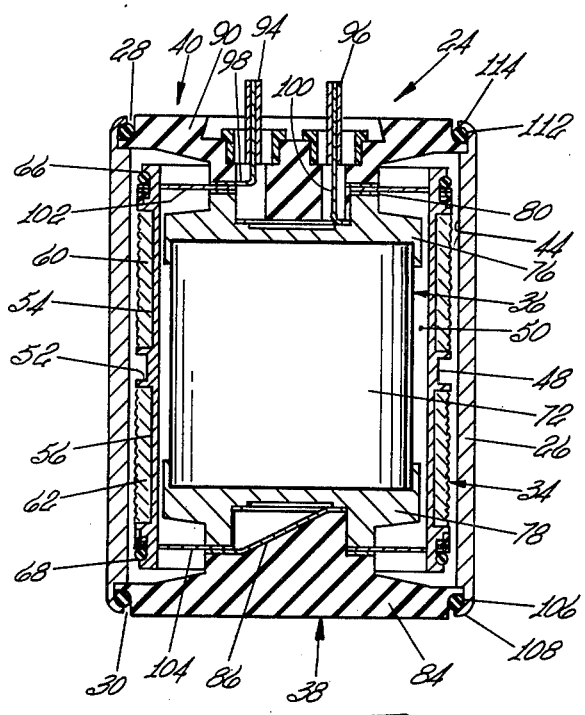
FIG. 1 is a front view partially in cross section of a compact, high sensitivity, low distortion seismometer using the teachings of the present invention.

FIG. 1 is cross-sectional view showing the compact, high sensitivity, low distortion seismometer generally as 24. The seismometer has an elongated tubular housing or outer pole formed of a magnetic material 26. The housing 26 has an opened tap end 28 and an opened bottom end 30.

The seismometer 24 has four major assemblies which can be generally characterized as a coil and mass assembly, shown by arrow 34; a magnetic assembly, shown by arrow 36; a bottom support assembly, shown by arrow 38, and a top support assembly, shown by arrow 40. Each of the assemblies represented by arrows 34 to 40 respectively, can be fabricated independently of the seismometer or of the other interfacing assemblies.

The coil and mass assembly, represented by arrow 34, is axially aligned in the housing 24, with an air gap 44 therebetween. The coil and mass assembly 34 has an elongated support member having an opening therethrough such as a coil form 48 which defines or includes a hollowed out central area 50. The coil form includes means for defining on an outer surface 52 a pair of coil guide means 54 and 56, one of which is adjacent each opening of the coil form 48. Each of the coil guide means 54 and 56 is adapted to support electrically conductive means such as coils 60 and 62 which are located within coil guide means 54 and 56, respectively. Each of the coils 60 and 62 have the center thereof co-axially aligned with the axis of the coil form 48 and openings defined thereby at each end of the coil form.

Figure 2:
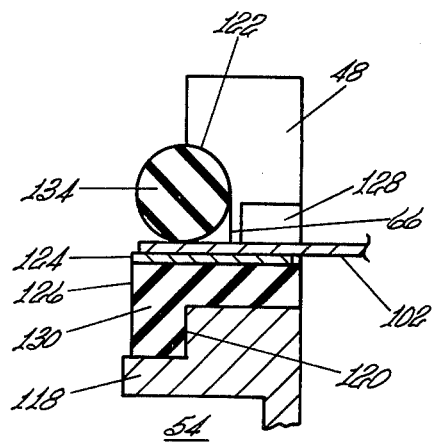
FIG. 2 is an exploded view showing the stacking relation between the coil form, an annular insulator, a commutating ring, a preformed spring and an O-ring.

The coil form 48 further includes means for forming a pair of annular grooves 66 and 68 respectively, each one of which is located around the periphery of the outer surface and positioned between a coil guide means and edge of each opening of the coil form. The details of the components stacked in the annular grooves 66 and 68 are shown in FIG. 2.

The magnetic assembly illustrated by arrow 36 includes a permanent magnet 72, which is located within the hollowed out central area 50 of the coil form 48. The exterior surface of the permanent magnet 72 is spaced a predetermined distance from the inner surface of the coil form 48 so as to permit vertical and rotational movement therebetween. A pair of electrically conductive pole pieces 76 and 78, which are identical in construction in the preferred embodiment, are located at and magnetically coupled to each end of the permanent magnet 72. The magnetic assembly 36 is located within the hollowed out central area 50 of the coil form 48 and is insulated from the top assembly, shown by arrow 40, solely by means of an insulating washer 80.

Figure 20:
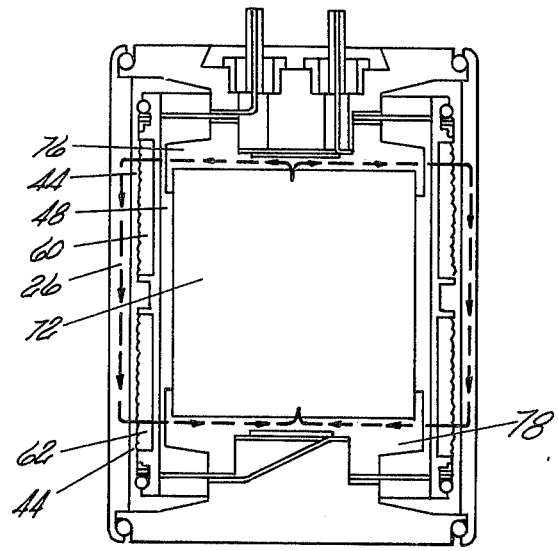
FIGS. 20 and 21 are a front cross-sectional view of a fully assembled seismometer formed of a coil and mass assembly, a magnetic assembly, a base assembly and a top assembly illustrating the lines of magnetic flux produced by the magnetic assembly by dashed arrows and the electrically-conductive paths by solid arrows, respectively.

The bottom assembly shown by arrow 38 is positioned in the bottom end of the housing and has a bottom support formed of an insulating non-magnetic material and a bottom spring 104 which cooperates with the bottom pole piece 78 of the magnetic assembly to rotatably support the magnetic assembly and to function as a part of the electrically conductive path as described and illustrated in FIG. 20.

The top assembly shown by arrow 40 is positioned in the top end 28 of the housing and has a top support 90 formed of an insulating material, a pair of terminals 94 and 96 an upper spring contact 98 and an upper magnet contact 100.

The coil and mass assembly shown by arrow 34 is supported by a pair of segmented preformed conductive springs 102 and 104. Each of the springs has the periphery thereof clamped in the annular slots 66 and 68 of the coil form 48. The center of each of the springs 102 and 104 have the center thereof slideably retained between the magnetic assembly 36, bottom support assembly 38 and top assembly 40. The springs 102 and 104 have wiping contacts formed thereon shown in detail in FIG. 9.

Vertical movement of the coil and mass assembly is permitted along the axis of the coil form 48, which vertical movement has restoring forces applied thereto by each of the springs 102 and 104. Similarly, application of rotational forces to the seismometer 24 results in the coil and mass assembly 34 freely rotating within the seismometer. The rotation is afforded at the top end by the sliding wiping action occurring between upper spring contact 98 which slideably engages spring 102.

Rotation is afforded at the bottom end of the coil form 48 by spring 104 which slideably engages the bottom spring 86 to permit a rotational wiping action therebetween.

The bottom support 84 is hermetically sealed within the bottom end 30 of the housing by means of sealing O-rings 106 which are clamped in place by bottom flaps 108. Similarly, the top support 90 is held in the open top end of housing 28 by means of an O-ring 112, which is held in place by sealing edge 114 of the housing 26.

Figure 3:
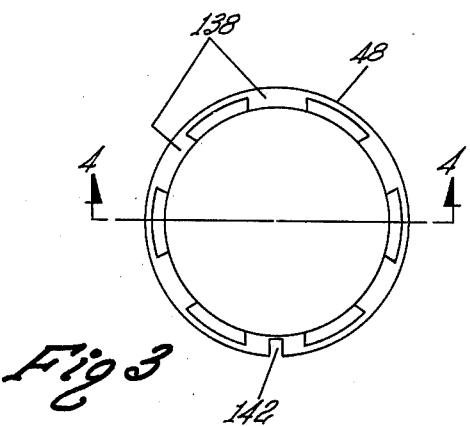
FIG. 3 is a top view of a coil form illustrating a plurality of co-planar slots formed at one end thereof.

FIG. 2 shows, in greater detail, the assembly of the components within an annular groove, such as annular groove 66. The components assembled in annular groove 66, as illustrated in FIG. 3, are identical to the components and assembly utilized in annular groove 68 located at the opposite end of the coil form 48. Thus, the components are interchangeable and can be used at either end, and the symmetry and assembly thereof is identical. Either end of the coil form assembly can be inserted into the bottom provided the insulating washer 80 is positioned on top.

Figure 4:
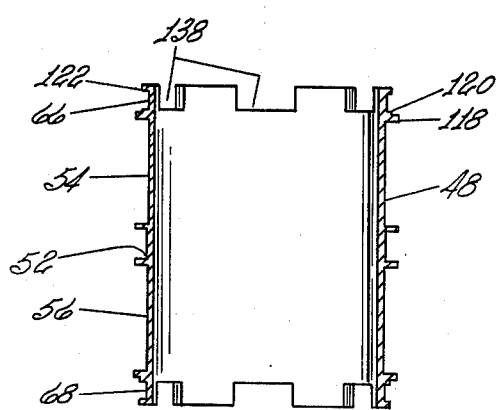
FIG. 4 is a sectional view of the coil form taken along Section lines 4—4 of FIG. 3.

Each end of coil form 48 has an annular groove near the opening and a section of the coil form end, an example of which is shown in greater detail in FIG. 4.

In FIG. 2, coil guide means 54 has an edge 118 which is in the form of a step having a vertical wall 120. The edge 118 and vertical wall 120 define one part of the annular groove 66. The other side of annular groove 66 is defined by an arcuate shaped sealing surface 122 which is spaced a predetermined distance from the edge 118. The components stacked within the annular groove 66 include a conductive spring 102, a commutating ring 124, an annular shaped insulator 126 having segments with raised tabs 128 and an annular shaped ring 130 located on the periphery thereof. The extending tabs 128 and the annular shaped ring 130 extend in opposite directions from the periphery of insulator 126. Extended tabs 128 of annular shaped insulator 126 support and insulate the spring 102 and commutating ring 124 from the sides of the coil form 48. Electrical contact is maintained between the spring 102 and the commutating ring 124 through the fixed, mating contacting surfaces therebetween. The entire sub-assembly is retained snugly within the annular shaped groove 66 by means of clamping O-ring 134. O-ring 134 is selected of a dimension and resiliency to snugly fit around the arcuate shaped edge 122 and into the space between surface 122 and the top of the spring 102. The O-ring 134 may be formed of a neoprene material having a hardness of about 70 on the Shore A scale. The O-ring contacts the top of the spring 102 and urges spring 102 into intimate fixed contact with the commutating ring 124. The spring 102 and commutating ring 124 are urged against the annular shaped insulator 126, causing the annular ring portion 130 thereof to snugly fit against and engage vertical wall 128 and the edge 118, forming a tight clamp sub-assembly on the coil and mass assembly.

FIGS. 3 and 4 show the details of the construction of the coil form 48. In FIG. 3, the top edge of the opening of the coil form 48 is identical and symmetrical to the opening at the other end thereof. The edge of the coil form 48 includes means for defining at each edge of the opening a plurality of spaced, radially extending co-planar slots 138. The co-planar slots 138 communicate with the annular groove, such as annular groove 66 at the top end of the coil form, adjacent the edge of the opening. In the preferred embodiment, there are six co-planar slots, thereby making the angles therebetween 60 degrees. One of the slots has a passageway 142 to cooperate with each commutating ring.

The cross-section of the coil form 48 illustrated in FIG. 4 shows the relationship between the co-planar slots 138 and the communication of the slots with the annular groove 66. The details of the coil guide rings 54 and 56 and the relation thereof in forming the edge of annular grooves 66 and 68, respectively, is shown in FIG. 4. Annular groove 66 has the edge 118 and vertical wall 120 located at one end thereof with the arcuate shaped surface 122 defining the edge of the opening of the coil form 48.

By use of the annular groove in combination with the various components described in connection with FIG. 2, variances in manufacturing tolerances between parts is less critical. The clamping effect of the O-ring against the stacked components, without any critical parameters, avoids the need to carefully match tolerances of parts.

Figure 5:
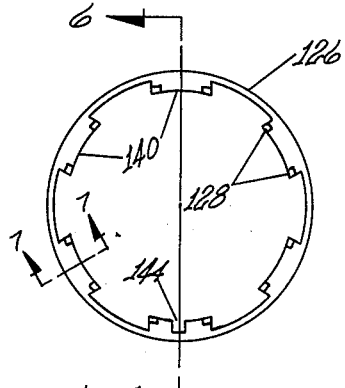
FIG. 5 is a top view of an annular shaped insulator assembled onto the coil form.
Figure 6:
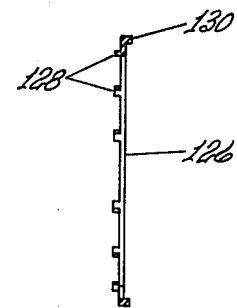
FIG. 6 is a sectional view of the annular shaped insulator taken along Section lines 6—6 of FIG. 5.
Figure 7:
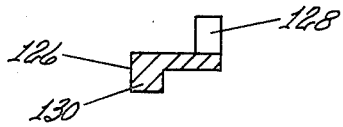
FIG. 7 is a sectional view of the annular shaped insulator taken along Section lines 7—7 of FIG. 5 showing segments of the insulator, the extending raised tabs, and an annular shaped ring extending in a direction opposite to the tabs.

FIGS. 5, 6 and 7 show the details of the annular shaped insulator 126 which is adapted to be located in the annular grooves 66 and 68, shown in FIG. 1. The annular shaped insulator 126 has a relatively thin ring shaped outer edge, which edge has a plurality of spaced co-planar segments 140 extending therefrom. Thus, formed around the periphery of each annular shaped insulator, such as insulator 126, is a plurality of segments 140 which correspond to the co-planar slots 138 in the end of the coil form 48. Each segment 140 has a pair of insulating tabs 128 formed therein extending in one direction therefrom, that direction being toward the end of the opening of the coil form 48. Also, on the opposite side of the periphery of the insulator 126, is an annular shaped ring 130 which extends in an opposite direction from the tabs. One segment of each insulator has a passageway 144 which cooperates with the commutating ring.

In assembly the components in the annular grooves, as illustrated in FIG. 2, the insulator 126 is positioned in the groove with the segments 140 thereof in each one of the slots of the coil form. The annular shaped insulator 126 is positioned between the commutating ring 124 and the coil guide means 54 which define the edge 118 and the vertical wall 120. The insulating tabs 128 are positioned to receive therebetween the segments of the springs, illustrated in FIG. 9, and the segments of the commutating ring, shown in FIG. 8, to insulate the same from the co-planar slots 138 of the coil form 48. In assembly, the annular shaped insulator 126 is located in a mating relationship between the commutating ring 124 and the edge 118 and vertical wall 120 defined by coil guide means 54.

Figure 8:
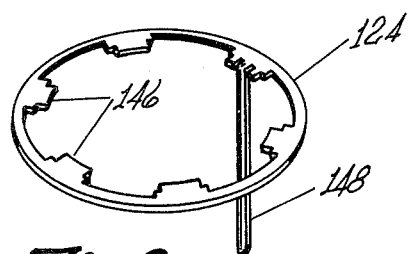
FIG. 8 is an isometric view of a commutating ring.

FIG. 8 illustrates one of the pair of commutating rings 124 shown in FIG. 2. The commutating ring has a plurality of co-planar radially extending segments 146 formed around the inner periphery thereof. In the preferred embodiment, there are six segments which are formed at an angle of 60 degrees therebetween, which segments are adapted to fit between the raised tabs 128 on the annular shaped insulator 126. Commutating ring 124 has an elongated conductive member 148 extending therefrom which passes through the passage 142 formed in the edge of coil form 48 (shown in FIG. 2) and through the passageway 144 formed in the annular shaped insulator 126 (shown in FIG. 5). The end of the elongated conductive member 148 passed through and beyond the edge of the coil guide means as shown in detail in FIG. 11. One of each pair of the commutating rings 124 are located at each end of the coil form 48 and each of the elongated conducting members extends past each of the coil guide means toward the interior of the other surface 52 of the coil form 48. In the preferred embodiment, the commutating rings are gold plates to insure good electrical contact with low surface resistance between the slideably engaging surfaces of the segmented springs being urged thereagainst by the clamping action of the O-ring 134 illustrated in FIG. 2.

Figure 9:
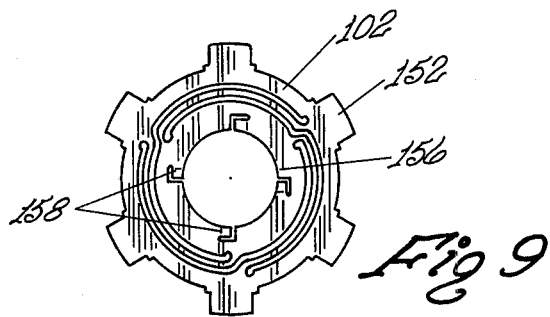
FIG. 9 is a top view of a segmented preformed conductive spring assembled on the coil form.

FIG. 9 illustrates in top view the construction of a segmented preformed conducting spring 102 which is identical to spring 104. The manufacture of preformed springs or spider springs for use in seismometer is well known in the art, and need not be discussed in detail here. In its loaded position, when the coil and mass assembly is moved vertically toward the top or bottom, springs 102 and 104 produce a restoring force which urges the coil and mass assembly toward the center of the housing.

The segmented conductive preformed spring illustrated in FIG. 9 is one of the pair of springs 102 and 104, one of which is located at each end of the coil form 48 with the outer periphery positioned in the annular groove 66 and 68 respectively. The segmented springs 102 and 104 support the coil and mass assembly for vertical movement thereof along the axis of the coil form 48. Spring 102 illustrated in FIG. 9 has a plurality of co-planar segments 152 which are adapted to be positioned within the co-planar slots 138 of the coil form 48, and supported between the raised tabs 128 of the annular shaped insulator 126. In the preferred embodiment, the segments 152 are positioned at a 60° angle relative to the other segments. The inner portion or center 156 of spring 152 includes a plurality of wiping tabs 158 which are in intimate engaging wiping contact with the upper spring contact 98 illustrated in FIG. 1 to insure low resistance and low distortion of an electrical signal passed therethrough.

Figure 10:
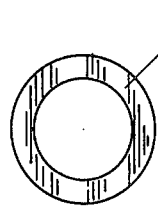
FIG. 10 is a top view of an insulator ring adapted to be positioned between the top preformed spring and a top pole piece.

FIG. 10 is a top view of insulator washer 80 which is the insulator washer adapted to be located between the top pole piece 76 and the top segmented spring 102 as shown in FIG. 1.

Figure 11:
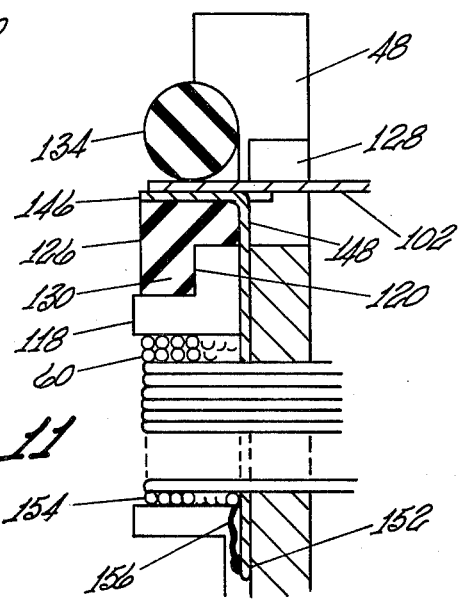
FIG. 11 is an exploded view of a sub-assembly on the coil form showing the relationship between a coil guide means, an annular shaped insulator, a commutating ring, a preformed spring and an O-ring illustrating the symmetry of the sub-assembly on the coil form.

FIG. 11 is an exploded view partially in cross section illustrating the relationship between the commutating ring and coil and the electrical connection thereof to the coils formed around the coil form 48. The commutating ring 124 has a portion thereof 146 in intimate contact with the segmented spring 102. An elongated conductive member 148 extends through the passageway 142 in the coil form 48, and passageway 144 formed in the annular shaped insulator 126, through the coil guide means 54, terminating in a deflected tip 152.

The coil 60 is formed by a plurality of windings of electrical conductors shown as 154. In assembly, a lead of the electrical conductor, shown as 156, is first soldered to the tip 152, then wound between the edges of the coil guide means 54 to form coil 60. Thus, the lead 156 is located at the center of the coil 60. After the step of winding, the trailing conductor of the electrical conductors is then extended around the coil form between the guide means to the opposite side of the coil form and is soldered to the trailing conductor of the electrical conductors forming coil 62. Similarly, coil 62, illustrated in FIG. 1, has the leading conductor thereof soldered to the tip of the commutating ring extending from the bottom thereof, and the trailing conductor of the electrical conductors forming the coil 62 is extended around to and soldered to the trailing conductor from coil 60. In this manner, the coils 60 and 62 are electrically connected in series opposition and electrical signals generated by the coils traversing the lines of magnetic flux during vertical movement of the coil and mass assembly appear across the pair of commutating rings. The electrical signals are then applied across the segmented springs 102 and 104 which are in intimate electrical contact with the commutating rings.

Figure 12:
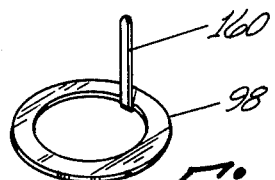
FIG. 12 is an isometric view of an upper spring contact which is adapted to slideably electrically contact the top preformed spring.

FIG. 12 shows the upper spring contact 98 having an elongated terminal connecting member 160 which extends into and is electrically connected to terminal 94. The upper spring contact 98 completes the electrical conductive path from the segmented spring 102 to terminal 94 through a slideable wiping electrical contact.

Figure 13:
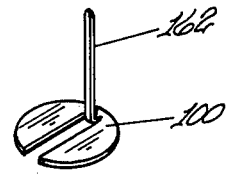
FIG. 13 is an isometric view of an upper magnet contact which is adapted to slideably electrically engage the top pole piece of the magnetic assembly.

FIG. 13 is a prospective view of the upper magnet contact 100 which has an elongated terminal contacting member 162 extending therefrom. Terminal contacting member 162 extends into and is electrically connected to terminal 96 as shown on FIG. 1. The upper magnet contact 100 is mechanically and electrically connected to the center of upper pole piece 76 and forms as the conductor which carries an electrical signal from pole piece 76 to terminal 96.

Figure 14:
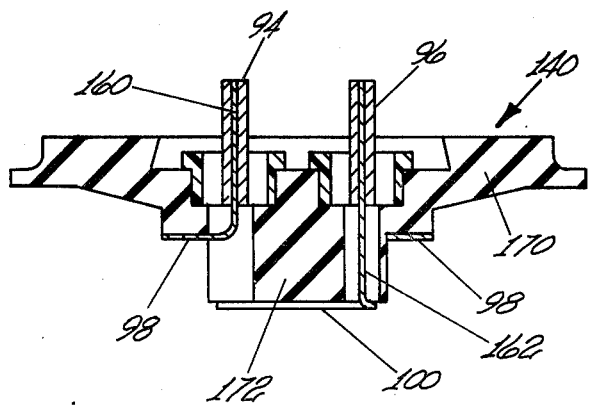
FIG. 14 is a sectional view of a top assembly showing electrical terminals, the upper spring contact and the upper magnet contact.

FIG. 14 is a front sectional view of the top assembly 40. The top assembly 40 has a top support 170 which includes means for supporting terminals 94 and 96 which extend from the interior of the housing to the exterior of the geophone. The terminal contacting member 160 of upper spring contact inserted into terminal 94 is shown. Likewise, the physical arrangement between the upper magnet contact 100 and the terminal contacting member 162 which is inserted into and electrically connected to terminal 96 is shown. An insulated center section 172 between top support 170 and top pole piece 76 functions to support and align the magnetic assembly. Upper spring contact 98 is in intimate slideable wiping electrical contact with the wiping contacts 158 located in the center of the segmented spring 102 shown in FIG. 9.

Figure 15:
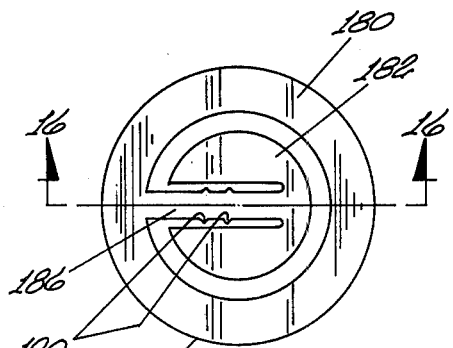
FIG. 15 is a top view of a bottom spring contact having bi-level annular shaped wiping contact member.

FIG. 15 is a top view of the bottom spring contact 86. The bottom spring contact has a planar annular shaped wiping contact 180 around the outer periphery of the bottom thereof and a raised annular wiping contact 182 which is joined to the lower planar contact 180 by means of a connecting strip 186. The connecting strip 186 has a plurality of notches or gripping edges 190 formed therein to insure a fixed tight mechanical attachment to the base support 84 shown in detail in FIGS. 17 and 18.

Figure 16:
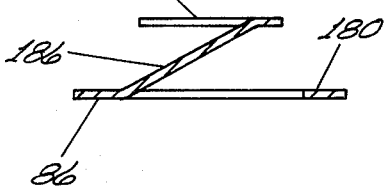
FIG. 16 is a cross-sectional end view of the bottom spring contact taken along Section lines 16—16 of FIG. 15.

FIG. 16 is a sectional view showing the two levels of contacts 180 and 182 of the bi-level bottom support spring 86.

Figure 17:
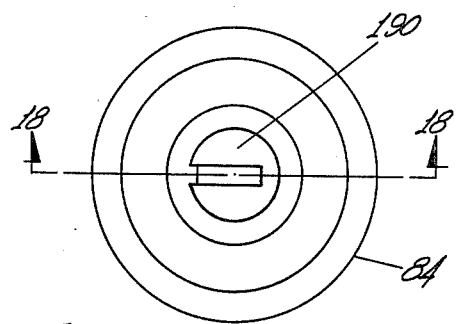
FIG. 17 is a top view of the bottom support member forming one part of the bottom support assembly.
Figure 18:
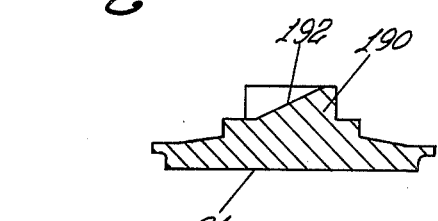
FIG. 18 is a front and cross-sectional view of the bottom support, taken along Section lines 18—18 of FIG. 17.

FIG. 17 shows the base support 84, which is formed of an insulating and non-magnetic material, which includes means defining a raised center portion 190. Raised center portion 190 is adapted to rotatably support the lower pole piece 78 and the permanent magnet 72 coupled thereto. In FIG. 18, the base support 84 is shown to have a sloping ridge 192 which is adapted to receive and cooperate with the connecting strip 186 of the bottom support spring 86.

Figure 19:
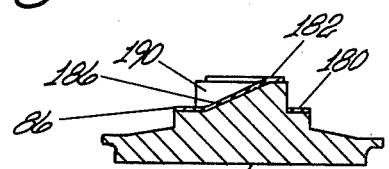
FIG. 19 is a front and cross-sectional view of the base assembly, formed of the base support and base spring contact.

FIG. 19 is a cross-section illustration of a bottom support assembly comprising the base support 84, base support spring 86 with the lower planar annular wiping contact 180 in intimate supporting contact with insulating support 84, the connecting strip 186 enclosing and gripping the raised center portion 190 of the base support 84 and the upper planar wiping contact 182 being located on the top of the raised portion 190. The upper planar annular wiping contact 182 engages the center of the bottom pole piece 78 and completes the electrical circuit therebetween.

FIG. 20 shows, by dashed arrows, the lines of magnetic flux produced by the magnetic assembly in a toroid pattern which is traversed by the coil and mass assembly moving vertically in response to detected seismic wave. The magnetic path traversed by the lines of magnetic flux commences within the permanent magnet 72, passes through top pole piece 76, through the coil form 48 into coil 60, through the air gap 44 to the housing 26, through the housing 26 down to the vicinity of the coil 62, through the air gap 44 between the housing 26 and coil 62, through the coil form 48 into the bottom pole piece 78 and back to the magnet 72. The magnetic assembly is stationary and the lines of magnetic force will traverse the same path at all times. Movement of the coil vertically along the axis of movement of the coil or mass assembly causes coil 60 and 62 to intersect with the lines of magnetic flux and to generate an electrical signal therein. The magnitude of the signal therein is representative of the movement of the coil mass assembly. Since the coils are connected in series opposition, the electrical signals generated thereby are additive.

Figure 21:
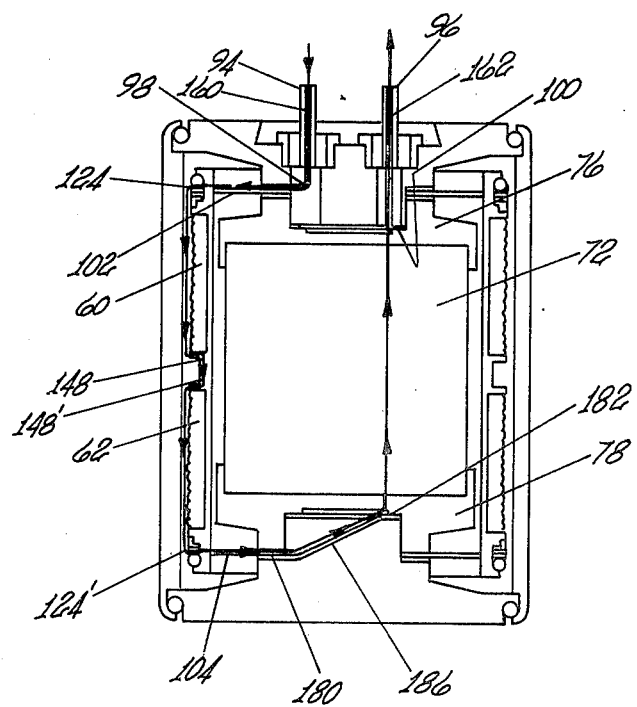

FIG. 21 shows, by solid arrows, the electrical circuit for conducting the electrical signal produced by the coils in traversing the lines of magnetic flux. The path includes terminal 94, terminal connecting member 160, upper spring contact 98, spring 102, commutating ring 124, elongated conductive member 148, coil 60 through coil 62, through an elongated conductive member 148 of a commutating ring 124, spring 104, lower planar annular wiping contact 180, connecting strip 186, upper planar annular wiping contact 182, pole piece 78, permanent magnet 72, top pole piece 76, upper magnet contact 100, terminal contacting member 162 to terminal 96. The generated electrical signal then appears across terminals 94 and 96.

The teachings of the present invention have utility in a compact high sensitivity, low distortion geophone, having a rotating coil, low distortion coil suspension system, and gold-plated contacts throughout. One example of such geophone had minimum spurious response past 250 hertz. The standard operating frequencies of a geophone using this invention are 8, 10, 14, 28 and 40 hertz. The open circuit damping ranged from 28% to 49%, depending on the frequency and operating characteristics of the components therein. In the preferred embodiment, the maximum coil excursion was in order of 0.090 inches (2.3 millimeters).

An example of the characteristics of a geophone utilizing the teachings of this invention are as follows for an 8 hertz geophone. The frequency range was ±0.5 hertz and the distortion was 0.2% or less with a driving velocity of 0.7 inches per second (1.8 centimeters per second) peak to peak at 12 hertz. The standard coil of resistances (±5%) was as low as 220 ohms up to a maximum of 560 ohms. The maximum case to coil motion peak to peak was 0.09 inches (0.23 centimeters). The intrinsic voltage sensitivity at 355 ohms was 0.68 volts per inch per second or 0.27 volts per centimeter per second. The voltage to weight ratio is 0.26 volts per inch per second per ounce or 0.36 volts per meter per second per gram. The intrinsic power sensitivity was 1.29 milliwatts per inch per second, or 2.0 watts per meter per second. The power to weight ratio was 0.49 milliwatts per inch per second per ounce or 0.27 watts per meter per second per gram. Normalized transduction in volts per inch per second constant was:

$$0.036\sqrt{Rc}$$

root or in volts per centimeter per second was:

$$0.0142\sqrt{Rc}$$

The motional impedence constant was $4.36\sqrt{Rc}$. The moving mass was 9.4 grams. The overall dimensions of the geophone utilizing the teachings of this invention were a height of 1.35 inches (3.43 centimeters), a diameter of 1.0 inch (2.54 centimeters), and a weight of 0.265 ounces or 75 grams.

What is claimed is:

1. A seismometer having a housing formed of magnetic material, a magnet assembly for producing lines of magnetic flux, a bottom assembly and top assembly, said seismometer comprising a coil and mass assembly including means defining an elongated support member having an opening extending therethrough to enclose a said magnetic assembly;

conductive resilient means fixedly connected to said support member and movably supported between a said magnetic assembly, a said top assembly and a said bottom assembly to permit vertical and rotational movement therebetween;

electrically conductive means formed around the periphery of said support member and adapted to generate an electrical signal by traversing lines of magnet flux produced by a said magnetic assembly;

commutating means electrically connected to said electrically conductive means and to said conductive resilient means for conducting an electrical signal from the electrically conductive means to the conductive resilient means;

rigid insulating means positioned between the support member, conductive resilient means, commutating means and a said magnetic assembly to define an electrically conductive path including said conductive resilient means, commutating means, electrically conductive means and a said magnetic assembly;

insulating resilient means extending around the periphery of the opening of said member for urging said conductive resilient means, said commutating means and said rigid insulating means into an integral sub-assembly; and conductive contacting means for slideably engaging the conductive resilient means and a said magnetic assembly for conducting an electrical signal therefrom during vertical movement of the elongated support member relative to a said magnetic assembly.

2. The seismometer of claim 1 wherein said means defining an elongated support member includes means defining a pair of guide means for confining the electrically conductive means into a pair of coils, one of which is located adjacent to and spaced a predetermined distance from each edge of the member defining the opening extending through the housing; and means for defining a pair of annular grooves, one of which is located in each spaced predetermined distance between the edge of the opening and the adjacent guide means, each of said annular grooves having said conductive resilient means, said commutating means, said rigid insulating means and said insulating resilient means stacked therein.

3. The seismometer of claim 2 wherein said conductive resilient means comprises a pair of preformed springs, each of which has a plurality of co-planar spaced segments extending radially outward therefrom and center wiping contacts.

4. The seismometer of claim 3 wherein said commutating means comprises a pair of rings, each of which has a plurality of co-planar segments extending radially inward therefrom.

5. The seismometer of claim 4 wherein said insulating means comprises a pair of annular shaped insulators, each of which has a thin outer ring, a plurality of spaced co-planar segments extending inwardly therefrom, and an annular shaped ring located and extending from one side thereof, said segments having extending therefrom, in a direction opposite that of the annular shaped ring, at least two spaced insulating tabs, said tabs being adapted to receive, in a stacking relation, one segment of one of the commutating rings and one segment of one of the segmented torsion springs.

6. The seismometer of claim 5 wherein said means defining the elongated member includes means defining at each edge of the opening a plurality of co-planar radially extending slots which communicate with an adjacent groove, said slots and grooves being adapted to receive and support one insulator, one commutating ring and one conductive spring in a stacked relation; and wherein said insulating resilient means comprise a pair of O-rings, one of which is positioned in each annular groove and located between the stacked insulator, commutating ring in each groove and spring and the adjacent edge of the member defining the opening.

7. A low distortion seismometer comprising an elongated tubular outer pole formed of magnetic material;

a magnetic assembly located in the interior of said outer pole and spaced a predetermined distance therefrom forming a tap therebetween, said magnetic assembly having a permanent magnet and a pair of conductive pole pieces electrically and magnetically coupled to the magnet;

a coil and mass assembly having a coil form having an opening extending therethrough, said coil form being positioned in said gap and enclosing and being adapted for vertical and rotational movement relative to said magnetic assembly;

a pair of conductive preformed springs one of which is attached to each end of the opening;

a pair of coils having the centers thereof co-axially aligned with the axis of the coil form and positioned with one of each coils adjacent an opening;

a pair of commutating rings each one of which is attached to each end near an opening and in electrical contact with the spring contiguous thereto and electrically connected to the coil adjacent thereto;

a pair of insulators each one of which is attached to each end near an opening and which supports and electrically insulates the spring and commutating ring contiguous thereto from the coil form;

a pair of O-rings each one of which is positioned between each end near an opening to clamp the adjacent spring, commutating ring and insulator into an integral sub-assembly with the coil form; and means for enclosing the elongated tubular outer pole including means for electrically connecting a pair of terminals to a conductive spring and one of the pole pieces.

8. The seismometer of claim 7 wherein the coil form comprises an elongated cylindrical member having a hollowed out central area and two co-axially aligned openings defining each end of the opening;

a pair of coil guides for receiving and supporting said coils, one of which is positioned adjacent to and spaced a predetermined distance from the edge of each opening, each of said coil guides having a raised annular edge formed around the outer periphery of the member forming an annular shaped gap between the adjacent edge of each opening and the annular edge of the coil guide; and a plurality of co-planar spaced radially extending slots formed in each edge of the coil form which communicates with the annular shaped groove adjacent the edge.

9. The seisometer of claim 8 wherein each of said conductive preformed springs have a plurality of co-planar spaced radially outwardly extending segments formed around the periphery thereof and a plurality of wiping contacts formed in the center thereof.

10. The seismometer of claim 9 wherein each of said commutating rings has a plurality of co-planar inwardly spaced segments formed around the inner periphery of the ring and an elongated conductive member which extends therefrom along the outer surface of the coil form.

11. The seismometer of claim 10 wherein each of said insulators has an outer ring having a plurality of spaced co-planar segments extending inwardly from the inner periphery thereof, said segments each having two raised insulating tabs extending in one direction therefrom, said insulator having on the surface opposite the tabs an annular ring formed therearound extending in a direction opposite to that of the tabs.

12. The seismometer of claim 11 wherein said enclosing means comprise a bottom assembly adapted to enclose one end of the outer pole and having a bottom support with a raised center portion to align and support one of the pole pieces and magnet and a bi-level fixed wiping contact therebetween to make electrical contact with one of the conductive preformed springs and the said one pole piece;

a top assembly adapted to enclose the other end of the outer pole and having a pair of terminals extending therefrom, said terminals being electrically connected through contact members to the other of said conductive preformed springs and to the center of said other pole piece; and an annular shaped insulating ring positioned between the other of said conductive preformed spring and said other pole piece.

13. A coil and mass assembly for a seismometer comprising a coil form having an opening extending therethrough;

a pair of conductive preformed springs one of which is fixedly attached to each end of the opening;

a pair of coils having the centers thereof co-axially aligned with the axis of the coil form and positioned with one of the coils adjacent an opening;

a pair of commutating rings each one of which is attached to each end near an opening and in electrical contact with the spring contiguous thereto, said rings being electrically connected to the coil adjacent thereto;

a pair of insulators each one of which is attached to each end near an opening and which supports and electrically insulates the spring and commutating ring contiguous thereto from the coil form; and a pair of O-rings each one of which is positioned between each end near an opening to clamp the adjacent spring, commutating ring and insulator into an integral sub-assembly with the coil form.

14. The coil and mass assembly of claim 13 wherein each of said insulators has an outer ring having a plurality of spaced co-planar segments extending inwardly from the inner periphery thereof, said segments each having two raised insulating tabs extending in one direction therefrom, said insulator having on the surface opposite the tabs an annular ring formed therearound extending in a direction opposite to that of the tabs.

15. The coil and mass assembly of claim 14 wherein each of said conductive preformed springs have a plurality of co-planar spaced radially outwardly extending segments formed around the periphery thereof and a plurality of wiping contacts formed in the center thereof.

16. The coil and mass assembly of claim 15 wherein each of said commutating rings has a plurality of co-planar inwardly spaced segments formed around the inner periphery of the ring and an elongated conductive member which extends therefrom along the outer surface of the member.

17. The coil and mass assembly of claim 16 wherein the coil form comprises an elongated cylindrical member having a hollowed out central area and two co-axially aligned openings defining each end of the opening;

a pair of coil guides for receiving and supporting said coils, one of which is positioned adjacent to and spaced a predetermined distance from the edge of each opening, each of said coil guides having a raised annular edge formed around the outer periphery of the member forming an annular shaped gap between the adjacent edge of each opening and the annular edge of the coil guide; and a plurality of co-planar spaced radially extending slots formed in each edge of the coil form which communicates with the annular shaped gap adjacent the edge.

18. A low distortion, high sensitivity seismometer comprising an elongated tubular housing formed of a magnetic material;

a coil and mass assembly axially aligned in said housing with an air gap therebetween and having a coil form including a hollowed out central area and two openings, said coil form including means defining on the outer surface a pair of coil guide means, one of which is adjacent each opening, and means forming a pair of peripheral annular grooves between each coil guide means and edge of each opening and a plurality of spaced radially extending co-planar slots at each edge communicating with the adjacent annular groove;

a pair of coils one of which is positioned in each coil guide means and which are electrically connected in series opposition;

a pair of preformed springs one of which is located in each of the annular grooves for supporting the coil and mass assembly for vertical movement along the axis of the coil form;

a pair of commutating rings each having a plurality of co-planar radially extending segments formed around the periphery thereof and an elongated conductive member extending therefrom, one of each of said commutating rings being positioned in each of the annular grooves with the co-planar segments aligned in the co-planar slots and positioned between the spring and adjacent coil guide means, said elongated conductive member being positioned adjacent to and extending along the outer surface and through the coil guide means and electrically connected to each of the coils;

a pair of annular shaped insulators each having formed around the periphery thereof a plurality of segments with each segment having a pair of insulating tabs formed therein extending in one direction therefrom and an annular shaped ring extending in an opposite direction from the tabs, one of each of said insulators being positioned in one of the annular grooves between one of the commutating rings and the edge of the coil guide means with the segments positioned in the co-planar slots, said extended insulating tabs being positioned to receive and insulate the segments of the spring and segments of the commutating ring from the co-planar slots of the coil form, and said annular shaped ring being located in mating relationship with the edge of the coil guide means adjacent the groove;

a pair of O-rings positioned between the spring and edge of the annular groove;

a magnetic assembly located within the hollowed out central area of the coil form and having
 a permanent magnet;
 a pair of electrically conductive pole pieces one of which is located at and magnetically coupled to each end of the magnet, one of said pole pieces having an insulator between the pole piece and spring adjacent the top opening and the other adjacent the bottom opening;

a bottom assembly positioned in one end of the housing and having
 a bottom support formed of an insulating material including means defining a raised center portion to rotatably support said other pole piece and magnet;
 a bottom spring contact having a planar annular shape wiping contact around the outer periphery to slideably engage and form in electrical contact with the spring in contact with said other pole piece, and a raised annular shaped contact joined to the planar contact and positioned in slideable wiping electrical contact with said other pole piece; and a top assembly positioned in the top end of the housing and having
 a top support formed of an insulating material having a raised center portion to rotatably support said one pole piece and magnet;
 a pair of terminals extending from the interior of the housing through and out from the top support;
 an upper spring contact mounted in said top support and in slideable electrical contact with the spring adjacent to and insulated from said one pole piece and having an extended conductor which is electrically connected to one of said terminals; and
 a lower spring contact mounted in said top support in fixed contact with said one pole piece and having an extended conductor which is electrically connected to the other of said terminals;

said magnetic assembly producing lines of magnetic flux traversing a path from the magnet through the pole pieces, the coil form, coils and housing, which lines of magnetic flux are traversed by vertical movement of the coils to generate electrical signals which are conducted therefrom across the terminals.

19. The seismometer of claim 18 wherein said springs are formed of beryllium copper and said O-rings are formed of a neoprene material having a hardness of about 70 on the Shore A scale.

* * * * *